United States Patent
Hellwig et al.

(10) Patent No.: US 8,352,804 B2
(45) Date of Patent: Jan. 8, 2013

(54) SYSTEMS AND METHODS FOR SECURE INTERRUPT HANDLING

(75) Inventors: Frank Hellwig, Wunstorf (DE); Antonio Vilela, Mering (DE)

(73) Assignee: Infineon Technologies AG, Neubiberg (DE)

( * ) Notice: Subject to any disclaimer, the term of this patent is extended or adjusted under 35 U.S.C. 154(b) by 279 days.

(21) Appl. No.: 12/784,015

(22) Filed: May 20, 2010

(65) Prior Publication Data

US 2011/0289377 A1   Nov. 24, 2011

(51) Int. Cl.
*G06F 11/30* (2006.01)
*G06F 11/00* (2006.01)

(52) U.S. Cl. .............. 714/52; 714/48; 714/49; 710/260; 710/264

(58) Field of Classification Search .................. 714/5.1, 714/5.11, 10, 21, 34, 38.13, 48, 49, 52, 758; 710/260, 264, 266

See application file for complete search history.

(56) References Cited

U.S. PATENT DOCUMENTS

| | | | | |
|---|---|---|---|---|
| 5,560,019 A | * | 9/1996 | Narad | 710/264 |
| 5,968,159 A | * | 10/1999 | Mattheis | 710/264 |
| 6,263,396 B1 | * | 7/2001 | Cottle et al. | 710/263 |
| 7,761,747 B2 | * | 7/2010 | Tsuboi | 714/51 |
| 2004/0237022 A1 | * | 11/2004 | Karpuszka et al. | 714/764 |

* cited by examiner

*Primary Examiner* — Joseph D Manoskey
(74) *Attorney, Agent, or Firm* — Dickstein Shapiro LLP

(57) ABSTRACT

The invention relates to systems for secure interrupt handling, a method for verifying a priority of a winning service request node and a method and an apparatus for verifying integrity of service requests.

In accordance with an aspect of the invention, there is provided a method for verifying a priority of a winning service request node (SRN) established in an arbitration between a plurality of service request nodes (SRNs) performed by an interrupt controller, the method comprising: storing the priority of the winning SRN in the interrupt controller; encoding the priority of the winning SRN, wherein the encoding allows for error detection; transmitting the encoded priority from the winning SRN to the interrupt controller; and verifying the priority of the winning SRN by comparing the encoded priority transmitted by the winning SRN with the priority of the winning SRN established in the arbitration and stored in the interrupt controller.

16 Claims, 6 Drawing Sheets

```
┌─────────────────────────────────────┐
│ Encoding the priorities of all SRNs │
│     having active interrupt requests │──── 601
└─────────────────────────────────────┘

┌─────────────────────────────────────┐
│ Transmitting the priorities and the │
│ encoded priorities of all SRNs having│
│ active interrupt requests to the    │
│        interrupt controller         │──── 603
└─────────────────────────────────────┘

┌─────────────────────────────────────┐
│ Arbitrating between the plurality of│
│ SNRs to determine a winning SRN     │
│         having the highest priority │──── 605
└─────────────────────────────────────┘

┌─────────────────────────────────────┐
│ Verifying the priority of the winning│
│ SRN by means of the encoded priority│
│      transmitted by the winning SRN │──── 607
└─────────────────────────────────────┘

┌─────────────────────────────────────┐
│  Returning the encoded priority of  │
│ the winning SRN to the plurality of │
│                SRNs                 │──── 609
└─────────────────────────────────────┘

┌─────────────────────────────────────┐
│ Verifying, by the winning SNR, the  │
│ encoded priority returned by the    │
│         interrupt controller        │──── 611
└─────────────────────────────────────┘
```

Figure 6

SYSTEMS AND METHODS FOR SECURE INTERRUPT HANDLING

The invention relates to a systems for secure interrupt handling, a method for verifying a priority of a winning service request node and a method and an apparatus for verifying integrity of service requests.

BACKGROUND OF THE INVENTION

Microcontrollers have to provide real time response to events in the embedded system they are controlling. When certain events occur, an interrupt system can signal the processor to suspend processing the current instruction sequence and to begin an interrupt service routine (ISR), also called "interrupt handler". The ISR will perform any processing required by the interrupt request (IRQ) issued by the source of the interrupt before returning to the original instruction sequence. Possible interrupt sources are device dependent, and often include events such as an internal timer overflow, completing an analog to digital conversion, a logic level change on an input such as from a button being pressed, and data received on a communication link. Where power consumption is important as in battery operated devices, interrupts may also wake a microcontroller from a low power sleep state where the processor is halted until it is required to do something by a peripheral event.

An interrupt controller is designed to provide interrupt capabilities to the main processor (central processing unit, CPU). When a device issues an interrupt request, it is delivered to the interrupt controller, from there the interrupt is generated in the CPU, which, in turn, checks with the interrupt controller for the source of the interrupt through a special register which are being hold at and managed by the interrupt controller.

An interrupt bus provides means by which a device that can generate an interrupt or service request is connected to a device that can service the interrupt. This may usually be an interrupt controller connected to a processor. Each device which can generate an interrupt, a so-called "interrupt source", such as a Universal Asynchronous Receiver Transmitter (UART) or a timer, has one or more service request nodes (SRNs) that connect directly onto the interrupt bus. It is noted that throughout the application the term "service request node" is used for a node connected to an interrupt bus and interrupt controller, respectively, wherein the service request node is assigned to a specific interrupt source, i.e. a device which can generate an interrupt. Accordingly, the service request node may be connected to or be part of the specific interrupt source.

A system may implement any number of interrupt busses. Each SRN may be configured in software to connect to one of a plurality of interrupt buses (depending on the implementation), or not connect to any interrupt bus. Each interrupt bus is controlled by an interrupt control unit (ICU), connected to SRNs.

An arbitration process for establishing the highest priority service request of a plurality of service requests is performed over the interrupt bus between the ICU and the SRNs. The ICU's processor can optionally accept this service request and generate an interrupt. It may also choose not to accept the service request if it currently servicing a higher priority service request.

Each SRN is assigned a service request priority number (SRPN) by the software running on the system, wherein each SRN that is participating in an arbitration over an interrupt bus requires a unique SRPN. However, two SRNs may share the same SRPN so long as they are using different interrupt busses.

Further, each SRN is also configurable with respect to the interrupt bus/ICU to which it transmits a service request (interrupt) with its assigned SRPN.

The ICU arbitrates between all active SRNs, i.e. SRNs which have an active service request, wherein the arbitration is carried out based on the priorities of the active SRNs.

As soon as at least one SRN is requested on the interrupt bus (indicated via the interrupt bus), the ICU requests all active SRNs to transmit their priorities via the bus. The specific wiring of the interrupt bus causes the highest priority (priority of the winning SRN) to be put through to the ICU. The ICU returns the priority of the winning SRN to the SRNs. All SRNs taking part in the arbitration round compare the priority returned by the ICU with their own priority and reset themselves if they are identical. The ICU takes over the priority of the winning SRN and forwards it to the CPU.

FIG. 1 exemplarily shows arbitration bus signals between an ICU 110 and a plurality of SRNs 121, 122 and 123.

ICU 110 has a first output connected to a first SRN 121 via connections 170 and 171, a second SRN 122 via connections 170 and 172, and a third SRN 123 via connections 170 and 173. Connections 170, 171, 172 and 173 form the ICU command bus (icu_cmd) which indicates the status of the interrupt arbitration process.

ICU 110 has a second output connected to a first SRN 121 via connections 180 and 181, a second SRN 122 via connections 180 and 182, and a third SRN 123 via connections 180 and 183, wherein the connections 180, 181, 182 and 183 form the result bus (icu_result).

Each SRN comprises three outputs, wherein the first outputs of the SRNs 121, 122 and 123 are respectively connected to the inputs of a first OR gate 131a via connections 151a, 152a and 153a, the second outputs of the SRNs 121, 122 and 123 are respectively connected to the inputs of a second OR gate 131b via connections 151b, 152b and 153b, and the third outputs of the SRNs 121, 122 and 123 are respectively connected to the inputs of a third OR gate 131c via connections 151c, 152c and 153c.

ICU 110 has a first input connected to the output of the first OR gate 131a via connection 160a, a second input connected to the output of the second OR gate 131b via connection 160b, and a third input connected to the output of the third OR gate 131c via connection 160c.

An ICU may be configured in software to undertake, for example, 1, 2, 3 or 4 arbitration rounds. This allows arbitration between either 3, 15, 63 or 255 SRNs. Accordingly, each SRN that is active on an interrupt bus may have a service request priority number (SRPN) between 1 and either 3, 15,63 or 255 (inclusive) depending on the number of arbitration rounds the ICU is configured to perform. Suitably, inactive SRNs may have an SPRN of 0, whereas no active SRN should have an SRPN of 0.

Arbitration may be carried out by splitting the SRPN values of the SRNs into e.g. 1, 2, 3 or 4 pairs of bits. Starting with the most significant pair of bits used in the arbitration, every SRN with a pending service request sends the value of its pair of bits for this arbitration round to the ICU. It does this by asserting none or one of the or-tree signals (or_tree01, or_tree10, or_tree11) to the ICU. The or_tree signals from each SRN are or'ed together (at OR gates 131a, 131b, 131c) with the similar signals from all the other SRNs capable of connecting to the interrupt bus, as shown in FIG. 1.

The ICU determines the highest priority number being sent to it for this pair (e.g. 11, 10, 01 or 00), stores it, and sends the result back to all the SRNs on the result bus (icu_result). All participating SRNs compare the result bus to their pair of SRPN bits. If they are equal, then the SRN is the winner or equal winner of this round of arbitration. If so, the SRN remains 'in' the arbitration, and participates in the next round of arbitration (unless this is the final arbitration round). Otherwise the SRN has lost the arbitration to a higher priority interrupt, and they drop 'out' of this arbitration. At the end of the e.g. 1, 2, 3 or 4 rounds of arbitration, a single SRPN will have won.

Signals may take a long time to propagate through the 'or_tree', be decoded by the ICU, issued onto the result bus and clocked into the SRNs. This may take longer than a single ICU clock cycle in systems with a fast ICU clock rate. The ICU may therefore be configurable to allow more than one clock cycle per arbitration round.

In an interrupt system, interrupt requests from interrupt sources are transferred via an interrupt arbitration and, possibly, via further interrupt management, to interrupt targets, e.g. CPUs.

Many types of failures caused by soft errors may possibly occur on this path. Some of these are for example:

An inactive interrupt may erroneously be identified as active and transferred to the CPU.

An active or inactive interrupt may be distorted and processed as a different interrupt by the CPU.

The CPU may reset a wrong interrupt though having received the correct interrupt.

The winner of the interrupt arbitration may not possess the highest priority.

International safety standards require to monitor interrupt systems in order to reach a so-called Safety Integrity Level (SIL). Known implementations of such monitoring requirements are based on application dependent schemes. Interrupt plausibility checks without hardware support are overly expensive and, in particular, reduce system performance. The level of checks required for this is normally much higher than actually required for the majority of typical interrupt service routines. Further, software solutions do not cover all types of errors and/or fault models. Software solutions are able to check whether an interrupt transferred to the CPU lies in an expected range. However, to check whether a certain interrupt is active at an interrupt source does not allow a definite conclusion as, in modern interrupt systems, the cause of an interrupt may already have been processed (and reset) by a previous call of the ISR.

Therefore, there e.g. exists a need for an apparatus and/or method providing application independent monitoring of interrupt systems that cover transient and permanent failures of interrupt busses and/or interrupt controllers.

BRIEF SUMMARY OF THE INVENTION

In accordance with an aspect of the invention, there is provided a method for verifying a priority of a winning service request node (SRN) established in an arbitration between a plurality of service request nodes (SRNs) performed by an interrupt controller, the method comprising: storing the priority of the winning SRN in the interrupt controller; encoding the priority of the winning SRN, wherein the encoding allows for error detection; transmitting the encoded priority from the winning SRN to the interrupt controller; and verifying the priority of the winning SRN by comparing the encoded priority transmitted by the winning SRN with the priority of the winning SRN established in the arbitration and stored in the interrupt controller.

In accordance with a further aspect of the invention, there is provided a system for secure interrupt handling, the system comprising a plurality of service request nodes (SRNs) and an interrupt controller, wherein the interrupt controller is configured to arbitrate between SRNs having active service requests to determine a winning SRN having the highest priority and store the priority of the winning SRN; the winning SRN is configured to encode its priority and transmit its encoded priority to the interrupt controller, wherein the encoding allows for error detection; the interrupt controller is configured to receive the encoded priority of the winning SRN, and forward the encoded priority of the winning SRN and the stored priority of the winning SRN established in the arbitration to an integrated circuit for verification.

Further features, aspects and advantages of the present invention will become apparent from the following detailed description of the invention made with reference to the accompanying drawings.

BRIEF DESCRIPTION OF THE SEVERAL VIEWS OF THE DRAWING(S)

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated as they become better understood by reference to the following detailed description.

FIG. 1 shows arbitration bus signals for an exemplary interrupt bus.

FIG. 2 exemplarily shows a simplified diagram of a system for secure interrupt handling according to an embodiment of the invention.

FIGS. 5 and 6 show schematic simplified flowcharts illustrating methods for verifying a priority of a winning service request node in accordance with further embodiments of the invention.

DETAILED DESCRIPTION OF THE INVENTION

Figure 1:
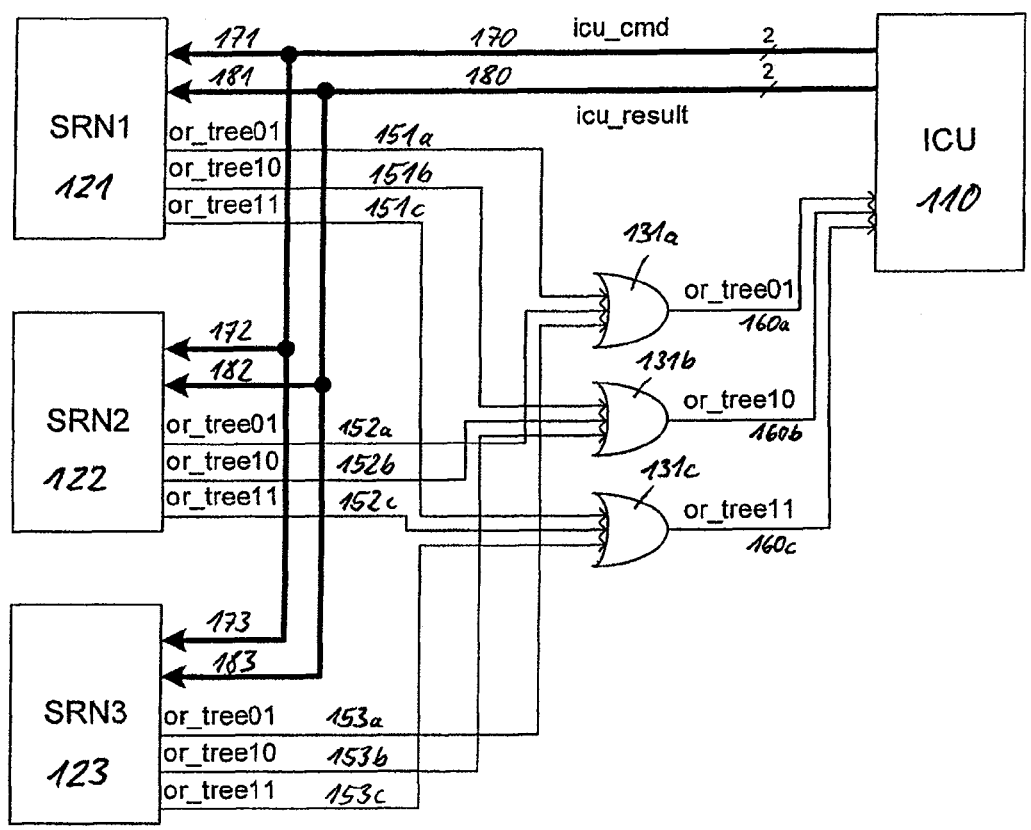

In the following detailed description, reference is made to the accompanying drawings, which form a part hereof, and in which is shown by way of illustration specific embodiments in which the invention may be practiced. It is to be understood that other embodiments may be utilized and structural or other changes may be made without departing from the scope of the present invention. The following detailed description, therefore, is not to be taken in a limiting sense, and the scope of the present invention is defined by the appended claims.

Microcontrollers have to provide real time response to events in the embedded system they are controlling. When certain events occur, an interrupt system can signal the processor to suspend processing the current instruction sequence and to begin an interrupt service routine (ISR), also called "interrupt handler". The ISR will perform any processing required by the interrupt request (IRQ) issued by the source of the interrupt before returning to the original instruction sequence. Possible interrupt sources are device dependent, and often include events such as an internal timer overflow, completing an analog to digital conversion, a logic level change on an input such as from a button being pressed, and data received on a communication link. Where power consumption is important as in battery operated devices, interrupts may also wake a microcontroller from a low power sleep state where the processor is halted until it is required to do something by a peripheral event.

An interrupt controller is designed to provide interrupt capabilities to the main processor (central processing unit, CPU). When a device issues an interrupt request, it is delivered to the interrupt controller, from there the interrupt is generated in the CPU, which, in turn, checks with the interrupt controller for the source of the interrupt through a special register which are being hold at and managed by the interrupt controller.

An interrupt bus provides means by which a device that can generate an interrupt or service request is connected to a device that can service the interrupt. This may usually be an interrupt controller connected to a processor. Each device which can generate an interrupt, a so-called "interrupt source", such as a Universal Asynchronous Receiver Transmitter (UART) or a timer, has one or more service request nodes (SRNs) that connect directly onto the interrupt bus. It is noted that throughout the application the term "service request node" is used for a node connected to an interrupt bus and interrupt controller, respectively, wherein the service request node is assigned to a specific interrupt source, i.e. a device which can generate an interrupt. Accordingly, the service request node may be connected to or be part of the specific interrupt source.

A system may implement any number of interrupt busses. Each SRN may be configured in software to connect to one of a plurality of interrupt buses (depending on the implementation), or not connect to any interrupt bus. Each interrupt bus is controlled by an interrupt control unit (ICU), connected to SRNs.

An arbitration process for establishing the highest priority service request of a plurality of service requests is performed over the interrupt bus between the ICU and the SRNs. The ICU's processor can optionally accept this service request and generate an interrupt. It may also choose not to accept the service request if it currently servicing a higher priority service request.

Each SRN is assigned a service request priority number (SRPN) by the software running on the system, wherein each SRN that is participating in an arbitration over an interrupt bus requires a unique SRPN. However, two SRNs may share the same SRPN so long as they are using different interrupt busses.

Further, each SRN is also configurable with respect to the interrupt bus/ICU to which it transmits a service request (interrupt) with its assigned SRPN.

The ICU arbitrates between all active SRNs, i.e. SRNs which have an active service request, wherein the arbitration is carried out based on the priorities of the active SRNs.

As soon as at least one SRN is requested on the interrupt bus (indicated via the interrupt bus), the ICU requests all active SRNs to transmit their priorities via the bus. The specific wiring of the interrupt bus causes the highest priority (priority of the winning SRN) to be put through to the ICU. The ICU returns the priority of the winning SRN to the SRNs. All SRNs taking part in the arbitration round compare the priority returned by the ICU with their own priority and reset themselves if they are identical. The ICU takes over the priority of the winning SRN and forwards it to the CPU.

FIG. 1 exemplarily shows arbitration bus signals between an ICU 110 and a plurality of SRNs 121, 122 and 123.

ICU 110 has a first output connected to a first SRN 121 via connections 170 and 171, a second SRN 122 via connections 170 and 172, and a third SRN 123 via connections 170 and 173. Connections 170, 171, 172 and 173 form the ICU command bus (icu_cmd) which indicates the status of the interrupt arbitration process.

ICU 110 has a second output connected to a first SRN 121 via connections 180 and 181, a second SRN 122 via connections 180 and 182, and a third SRN 123 via connections 180 and 183, wherein the connections 180, 181, 182 and 183 form the result bus (icu_result).

Each SRN comprises three outputs, wherein the first outputs of the SRNs 121, 122 and 123 are respectively connected to the inputs of a first OR gate 131a via connections 151a, 152a and 153a, the second outputs of the SRNs 121, 122 and 123 are respectively connected to the inputs of a second OR gate 131b via connections 151b, 152b and 153b, and the third outputs of the SRNs 121, 122 and 123 are respectively connected to the inputs of a third OR gate 131c via connections 151c, 152c and 153c.

ICU 110 has a first input connected to the output of the first OR gate 131a via connection 160a, a second input connected to the output of the second OR gate 131b via connection 160b, and a third input connected to the output of the third OR gate 131c via connection 160c.

An ICU may be configured in software to undertake, for example, 1, 2, 3 or 4 arbitration rounds. This allows arbitration between either 3, 15, 63 or 255 SRNs. Accordingly, each SRN that is active on an interrupt bus may have a service request priority number (SRPN) between 1 and either 3, 15,63 or 255 (inclusive) depending on the number of arbitration rounds the ICU is configured to perform. Suitably, inactive SRNs may have an SPRN of 0, whereas no active SRN should have an SRPN of 0.

Arbitration may be carried out by splitting the SRPN values of the SRNs into e.g. 1, 2, 3 or 4 pairs of bits. Starting with the most significant pair of bits used in the arbitration, every SRN with a pending service request sends the value of its pair of bits for this arbitration round to the ICU. It does this by asserting none or one of the or-tree signals (or_tree01, or_tree10, or_tree11) to the ICU. The or_tree signals from each SRN are or'ed together (at OR gates 131a, 131b, 131c) with the similar signals from all the other SRNs capable of connecting to the interrupt bus, as shown in FIG. 1.

The ICU determines the highest priority number being sent to it for this pair (e.g. 11, 10, 01 or 00), stores it, and sends the result back to all the SRNs on the result bus (icu_result). All participating SRNs compare the result bus to their pair of SRPN bits. If they are equal, then the SRN is the winner or equal winner of this round of arbitration. If so, the SRN remains 'in' the arbitration, and participates in the next round of arbitration (unless this is the final arbitration round). Otherwise the SRN has lost the arbitration to a higher priority interrupt, and they drop 'out' of this arbitration. At the end of the e.g. 1, 2, 3 or 4 rounds of arbitration, a single SRPN will have won.

Signals may take a long time to propagate through the 'or_tree', be decoded by the ICU, issued onto the result bus and clocked into the SRNs. This may take longer than a single ICU clock cycle in systems with a fast ICU clock rate. The ICU may therefore be configurable to allow more than one clock cycle per arbitration round.

In an interrupt system, interrupt requests from interrupt sources are transferred via an interrupt arbitration and, possibly, via further interrupt management, to interrupt targets, e.g. CPUs.

Many types of failures caused by soft errors may possibly occur on this path. Some of these are for example:

- An inactive interrupt may erroneously be identified as active and transferred to the CPU.
- An active or inactive interrupt may be distorted and processed as a different interrupt by the CPU.
- The CPU may reset a wrong interrupt though having received the correct interrupt.
- The winner of the interrupt arbitration may not possess the highest priority.

International safety standards require to monitor interrupt systems in order to reach a so-called Safety Integrity Level (SIL). Known implementations of such monitoring requirements are based on application dependent schemes. Interrupt plausibility checks without hardware support are overly expensive and, in particular, reduce system performance. The level of checks required for this is normally much higher than actually required for the majority of typical interrupt service routines. Further, software solutions do not cover all types of errors and/or fault models. Software solutions are able to check whether an interrupt transferred to the CPU lies in an expected range. However, to check whether a certain interrupt is active at an interrupt source does not allow a definite conclusion as, in modern interrupt systems, the cause of an interrupt may already have been processed (and reset) by a previous call of the ISR.

Therefore, there e.g. exists a need for an apparatus and/or method providing application independent monitoring of interrupt systems that cover transient and permanent failures of interrupt busses and/or interrupt controllers.

The present invention provides systems and methods for secure interrupt handling. According to an embodiment of the present invention, a system for secure interrupt handling may comprise a plurality of service request nodes (SRN) and an interrupt controller, wherein each of the plurality of SRNs which has an active service request (e.g. an interrupt request or just "interrupt") may send its priority to the interrupt controller and the interrupt controller may receive the priorities of the SRNs having active service requests and arbitrate between the SRNs having active service requests to determine a winning SRN having the highest priority.

It is noted that, hereinafter, the terms "interrupt request" and "interrupt" will be used synonymously to the term "service request" and, thus, are intended to be equivalent to service request in its broadest meaning hereinafter.

Further, the interrupt controller may store the priority of the winning SRN, and transmit a signal indicating the winning SRN, e.g. the priority of the winning SRN, to the SRNs having active interrupt or service requests.

The winning SRN may encode its priority and transmit its encoded priority to the interrupt controller, wherein the encoding allows for error detection.

In particular, the winning SRN may use an error-detecting code (EDC) or an error-correcting code (ECC) to encode its priority. The SRNs may comprise EDC/ECC registers, or, alternatively, EDC/ECC encoders to EDC/ECC encode their priorities. In the latter case (SRNs comprise EDC or ECC encoders), a central processing unit (CPU) may check the priorities regularly to find possible errors in the configuration of the system.

The interrupt controller may receive the encoded priority of the winning SRN and either verify the encoded priority of the winning SRN by means of the stored priority of the winning SRN, or forward the encoded priority of the winning SRN and the stored priority of the winning SRN established in the arbitration to an integrated circuit (IC) for verification. In this case, the IC, e.g. a Central Processing Unit (CPU) may then carry out the verification by comparing the two priorities transmitted from the interrupt controller, wherein the uncoded priority (stored in the interrupt controller) may be encoded (e.g. EDC or ECC coded) prior to the comparison.

Additionally, the interrupt controller may return the encoded priority of the winning SRN to the SRNs having active service requests, in particular to the winning SRN which may then verify the encoded priority returned by the interrupt controller by comparing the returned encoded priority with its own priority.

Prior to the comparison the winning SRN may encode (e.g. EDC or ECC) its priority.

In a first embodiment of the SRNs comprising EDC/ECC registers, the winning SRN may compare the returned EDC/ECC encoded priority with an EDC/ECC encoded priority in its EDC/ECC register to verify the ECC encoded priority returned by the interrupt controller.

In a second embodiment of the SRNs comprising EDC/ECC encoders, the winning SRN may compare the returned EDC/ECC encoded priority with the EDC/ECC encoded priority output by its EDC/ECC encoder to verify the ECC encoded priority returned by the interrupt controller.

According to a further embodiment of the present invention, a system for secure interrupt handling comprises a plurality of service request nodes (SRN) having EDC or ECC registers and an interrupt controller, wherein the plurality of SRNs which have active interrupt requests are configured to send their priorities to the interrupt controller; and the interrupt controller is configured to arbitrate between the plurality of SRNs to determine a winning SRN having the highest priority, read out the EDC or ECC encoded priority from the EDC or ECC register of the winning SRN, and verify the priority of the winning SRN by means of the EDC or ECC encoded priority of the winning SRN or forward the encoded priority of the winning SRN and the priority of the winning SRN established in the arbitration to an integrated circuit for verification.

Advantageously, the interrupt controller is further configured to return the EDC or ECC encoded priority of the winning SRN to the SRNs having active interrupt requests.

Advantageously, the winning SRN is further configured to verify the EDC or ECC encoded priority returned by the interrupt controller.

Advantageously, the winning SRN is further configured to verify the EDC or ECC encoded priority returned by the interrupt controller by comparing the returned EDC or ECC encoded priority with an EDC or ECC encoded priority in its EDC or ECC register.

According to a further embodiment of the present invention, a method for verifying a priority of a winning service request node (SRN) established in an arbitration between a plurality of service request nodes (SRNs) may comprise storing the priority of the winning SRN in an interrupt controller and encoding the priority of the winning SRN, wherein the encoding allows for error detection.

In particular, an error-detecting code (EDC) or an error-correcting code (ECC) may be used for encoding the priority of the winning SRN.

The method may further comprise transmitting the encoded priority from the winning SRN to the interrupt controller and verifying the priority of the winning SRN by comparing the encoded priority transmitted by the winning SRN with the priority of the winning SRN established in the arbitration and stored in the interrupt controller.

The step of verifying the priority of the winning SRN may be carried out by the interrupt controller or the interrupt controller may forward the two priorities to be compared to an integrated circuit for verification.

The method may further comprise returning the encoded priority of the winning SRN to the plurality of SRNs and verifying, by the winning SRN, the encoded priority returned by the interrupt controller by comparing the returned encoded priority with its own priority.

According to a further embodiment of the present invention, a method for verifying integrity of service requests may comprise: encoding service requests of a plurality of service request sources, wherein the encoding allows for error detection, transmitting the service requests and the encoded service requests from the plurality of service request sources to a service request controller, determining a winning service request source by arbitrating between the plurality of service request sources, and verifying the identity of the winning service request source by means of the encoded service request of the winning service request source.

Advantageously, the method may further comprise returning the encoded service request of the winning service request source to the plurality of service request sources, and verifying, by the winning service request source, the returned encoded service request by comparing the encoded service request returned from the service request controller with the service request of the winning service request source.

According to a further embodiment of the present invention, an apparatus for verifying integrity of service requests may comprise: means for encoding service requests of a plurality of service request sources, wherein the encoding allows for error detection (e.g. EDC or ECC), means for transmitting the encoded service requests from the plurality of service request sources to a service request controller, means for determining a winning service request source by arbitrating between the plurality of service request sources, means for returning the encoded service request of the winning service request source to the plurality of service request sources, and means for verifying, at the winning service request source, the returned encoded service request by comparing the encoded service request returned from the service request controller with the service request of the winning service request source.

Advantageously, the means for encoding may comprise EDC or ECC registers or an EDC or ECC encoder. Advantageously, the apparatus for verifying integrity of service requests may further comprise means for storing the encoded service request of the winning service request source and means for forwarding the stored encoded service request to an integrated circuit for verification.

Figure 2:
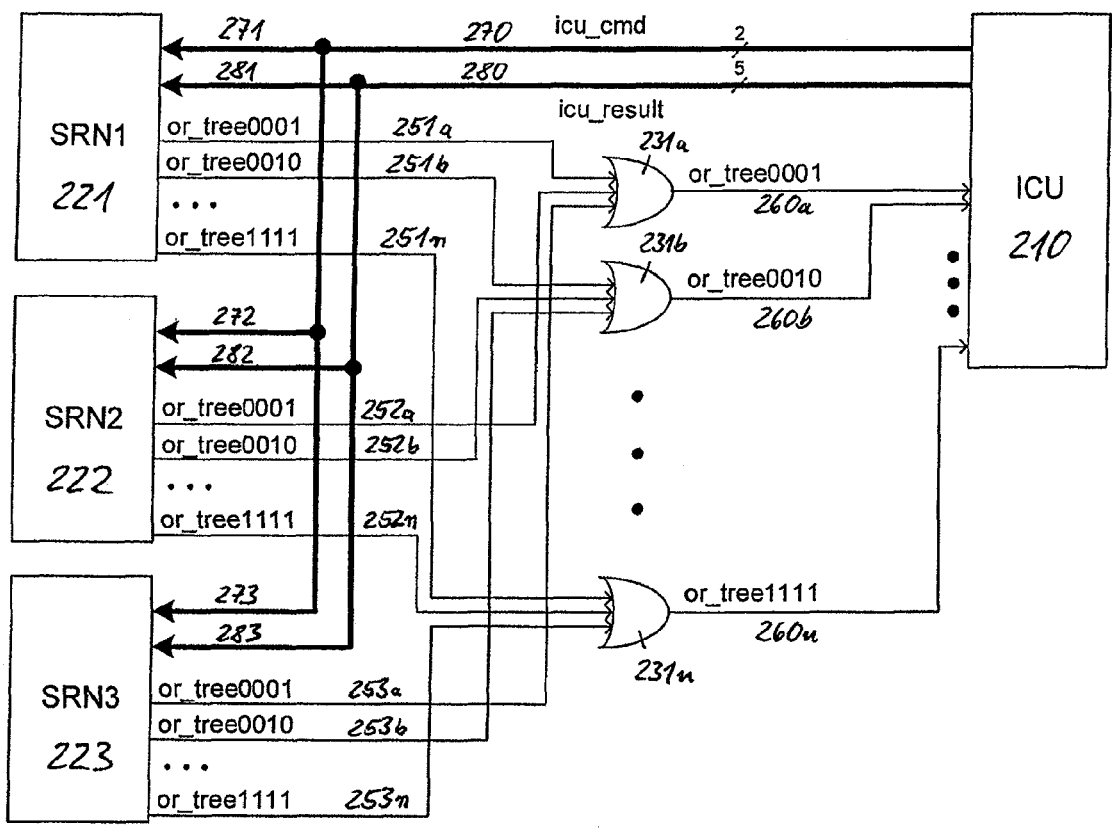

FIG. 2 exemplarily shows a simplified diagram of a system for secure interrupt handling according to an embodiment of the invention.

ICU 210 has a first output connected to a first SRN 221 via connections 270 and 271, a second SRN 222 via connections 270 and 272, and a third SRN 223 via connections 270 and 273. Connections 270, 271, 272 and 273 form the ICU command bus (icu_cmd) which indicates the status of the interrupt arbitration process.

ICU 210 has a second output connected to a first SRN 221 via connections 280 and 281, a second SRN 222 via connections 280 and 282, and a third SRN 223 via connections 280 and 283, wherein the connections 280, 281, 282 and 283 form the result bus (icu_result).

Each SRN comprises n outputs, e.g. 15 outputs in this embodiment, wherein the first outputs of the SRNs 221, 222 and 223 are respectively connected to the inputs of a first OR gate 231*a* via connections 251*a*, 252*a* and 253*a*, the second outputs of the SRNs 221, 222 and 223 are respectively connected to the inputs of a second OR gate 231*b* via connections 251*b*, 252*b* and 253*b*, . . . , and the nth outputs of the SRNs 221, 222 and 223 are respectively connected to the inputs of a nth OR gate 231*n* via connections 251*n*, 252*n* and 253*n*.

ICU 210 has a first input connected to the output of the first OR gate 231*a* via connection 260*a*, a second input connected to the output of the second OR gate 231*b* via connection 260*b*, . . . , and an nth input connected to the output of the nth OR gate 231*n* via connection 260*n*.

Figure 3:
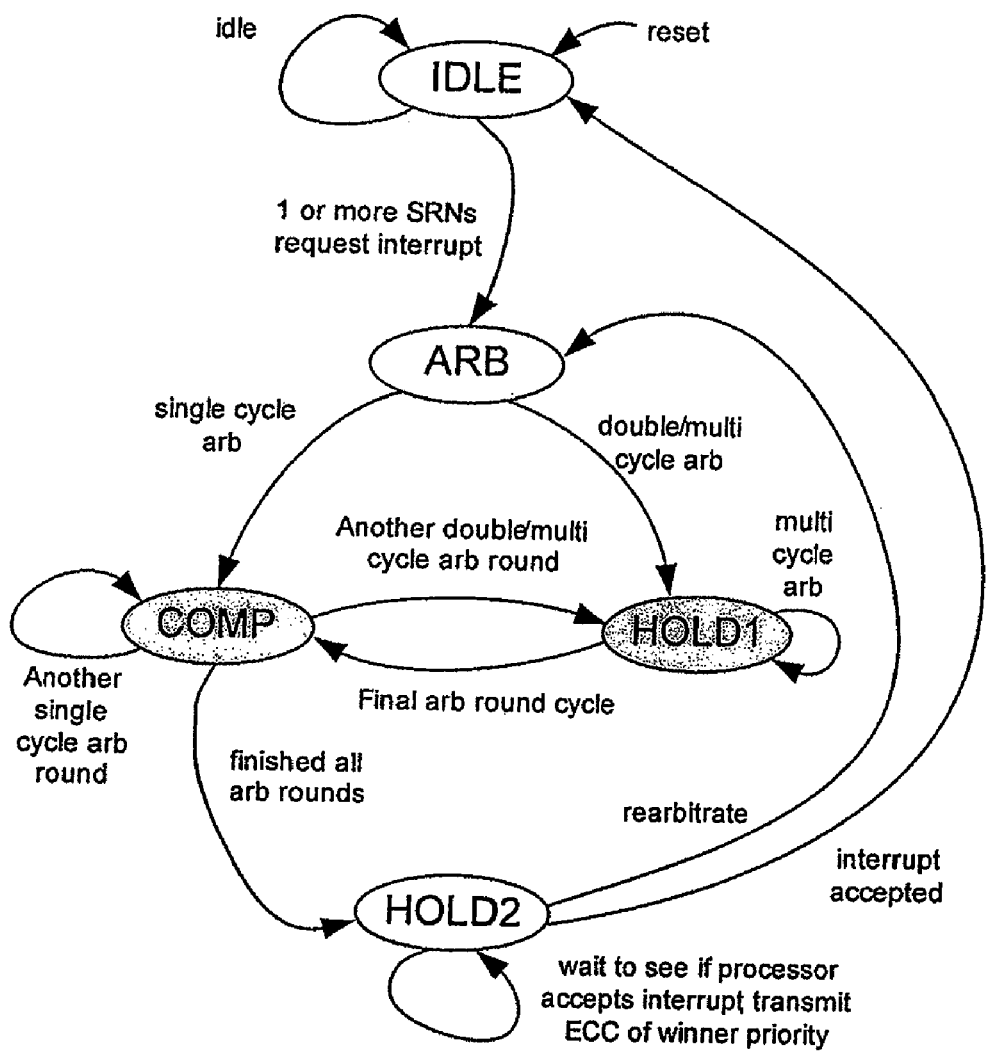
FIG. 3 shows a simplified diagrammatic plan exemplarily illustrating different interrupt bus states and possible transitions between these states in accordance with a further embodiment of the invention.

FIG. 3 shows a simplified diagrammatic plan exemplarily illustrating different interrupt bus states and possible transitions between these states in accordance with a further embodiment of the invention.

The ICU command bus (icu_cmd) indicates the status of the interrupt arbitration process. In this embodiment, the interrupt arbitration process comprises four states, IDLE, ARB, COMP, and HOLD, wherein the state "HOLD" is used in two different contexts (during arbitration and after arbitration) that are herein referred to as "HOLD1" and "HOLD2".

The default and reset state is IDLE. In the IDLE state, each SRN that is enabled onto the interrupt bus and has a service request asserts its or_tree0011 signal. The or_tree0011 signals from all SRNs that can connect to the interrupt bus are or'ed together and input to the ICU, as shown in FIG. 2. If any SRN asserts its or_tree0011 signal, the ICU's or_tree0011 input will be asserted.

If one or more SRNs assert their or_tree0011 signals then an arbitration is initiated and the next ICU command bus (icu_cmd) state will be ARB. Otherwise the ICU continues to wait for the next service request and the next icu_cmd state is again IDLE.

When the IDLE state is entered from the HOLD2 state, this indicates that the service request that won the previous arbitration has been accepted by the processor and an interrupt will be generated. The SRN that was asserting or_tree0010 during the previous HOLD2 (the winning SRN) should clear its service request flag and not participate in any arbitration that immediately follows. If no SRN asserted or_tree0010 during the previous HOLD2 then no interrupt is generated and no SRN should clear its service request flag.

When the ARB state is entered, it is a signaled to all SRNs that a new interrupt arbitration is about to begin. Any SRNs with a pending service request will participate. Any SRN that gets a new service request during the arbitration (i.e. in the subsequent COMP and HOLD1 states) will not enter the arbitration, but wait for the next ARB state. Only SRNs with service requests that are active during the ARB state will participate in the subsequent arbitration. These SRNs all start the first arbitration round 'in' the arbitration. The number of arbitration rounds used for each interrupt arbitration is software configurable in the ICU. Varying the number of arbitration rounds, for example, from 1 to 4 allows arbitration between 3, 15, 63 or 255 active SRNs, and allows the user to have control over the interrupt latency.

The result bus (icu_result) is used during ARB to inform all the participating SRNs how many arbitration rounds there will be, and hence which bit pairs of the SRPN to use in which round. If the ICU is configured to perform single cycle arbitration rounds, the next icu_cmd state is COMP. Otherwise, the ICU is configured to perform double or multi-cycle arbitration rounds and the next icu_cmd state is HOLD1.

When the ARB state is entered directly from the HOLD2 state, if an SRN had won the previous arbitration (i.e. it asserted or_tree0010 during HOLD2) that SRN's service request was denied for the previous arbitration and the SRN should participate in this new arbitration.

Arbitration rounds may take 1, 2 or more cycles. The final (or only) state of each arbitration round is the COMP state. For double and multi-cycle arbitration rounds, however, each round is extended in duration by spending one or more cycles in the HOLD1 state. During the HOLD1 state, each SRN that is still 'in' the arbitration asserts one or none of its or_treeXXXX signals according to the SPRN bits used for this arbitration round.

The ICU determines the highest priority SPRN pair of bits from the SRNs that are in the arbitration this round and asserts icu_result accordingly. For double cycle arbitration rounds the next state is COMP. For multi-cycle arbitration rounds the next state is COMP if there is only one more ICU clock cycle before the end of the arbitration round. Otherwise the next state is HOLD1. SRNs will maintain their or_treeXXXX signals at the same level for the entire arbitration round (i.e. the HOLD1 and COMP states). Even if an SRN's service request is cancelled or disabled during HOLD1, the or_treeXXXX signals will be maintained throughout any subsequent HOLD1 cycles and the next COMP cycle.

During the COMP state each SRN that is still 'in' the arbitration asserts its or_treeXXXX signals according to the pair of SRPN bits for this arbitration round. The ICU determines the highest priority SRPN pair of bits from the SRNs that are in the arbitration this round and asserts icu_result accordingly.

It is noted that for double and multi-cycle arbitration rounds, the or_treeXXXX and icu_result signal logic remains the same for HOLD1 and COMP states. The COMP state differs from the HOLD1 state in two ways.

Firstly, each SRN that is 'in' the arbitration compares the icu_result to its SRPN bit pair for this arbitration round. If they are the same then this SRN has either won, or jointly won this arbitration round. If so, and this is not the final arbitration round, then the SRN is still 'in' the arbitration for the next round. If it is the final arbitration round then the SRN has won the arbitration. If the icu_result differs from the SRN's SRPN bit pair for this arbitration round then the SRN has lost this arbitration round and the arbitration in general. The SRN will drop 'out' of any further arbitration rounds if there are any. Secondly, following the COMP state the arbitration either moves onto the next pair of SRPN bits, or the arbitration finishes.

If this arbitration round is the last arbitration round of an arbitration, then the next state is HOLD2.
For single cycle arbitration rounds which have not finished the arbitration, the next state is COMP.
For double and multi-cycle arbitration rounds which have not finished the arbitration, the next state is HOLD1.

When the interrupt bus reaches the HOLD2 state, a single SRN has usually won the arbitration. The winning SRN asserts or_tree0010 to acknowledge that it has won the arbitration and the request is still active (was not cancelled during arbitration). The winning SRN further sends an e.g. 5 bit Error Correcting Code (ECC) of its priority via e.g. or_tree0100 to or_tree1000 to the ICU and the ICU compares the received priority with the stored priority of the winner of the arbitration (i.e. the winning SRN) for verification. Additionally, the ICU returns the e.g. 5 bit ECC via the result bus (icu_res) to the SRNs and the winning SRN compares the priority received from the ICU with its own priority.

If or_tree0010 is asserted the ICU reports the service request and the priority number to the processor. The processor then has the option to accept the service request and generate an interrupt. It will choose not to accept the service request if it is already undertaking a higher priority service request.

The processor may take a number of cycles to accept a service request. Whilst the ICU is waiting for the service request to be accepted it stays in the HOLD2 state.

When the processor accepts the service request it sends an acceptance signal to the ICU. The ICU then makes the next icu_cmd state IDLE. When a winning SRN sees the transition from the HOLD2 state to IDLE it clears its service request flag.

If no SRN acknowledges winning the arbitration (or_tree0010 negated in HOLD2), because the winning SRN has had its service request cancelled or disabled during arbitration, then the ICU may make the transition to IDLE without any SRN clearing its service request flag. However, to avoid adding extra interrupt latency, the ICU does not need to wait to qualify the winning SRPN with or_tree0010 before making a service request to the processor.

The ICU will time out after an implementation specific (and possibly variable) number of cycles. After this time, if the processor has not accepted the service request, the ICU will rearbitrate by making the next state ARB. A winning SRN that sees the state transition from HOLD2 to ARB will ignore the fact that it has won the arbitration and participate in the next arbitration.

If no SRN wins the arbitration (winning SRPN is zero), then no interrupt is generated and either IDLE or ARB may be the next state (implementation specific).

Figure 4:
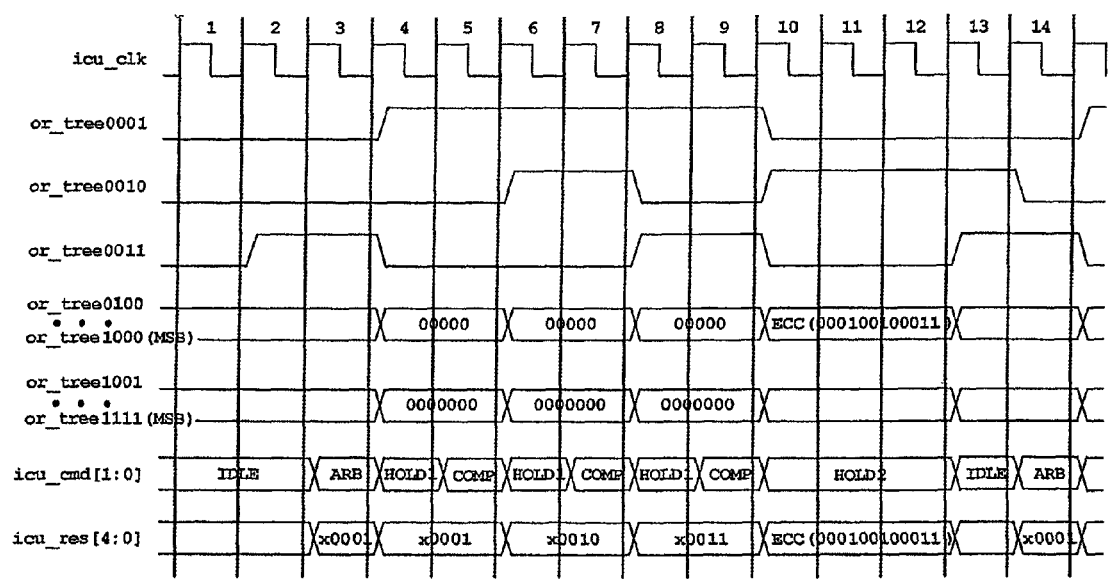
FIG. 4 shows an exemplary arbitration protocol of the system shown in FIG. 2.

FIG. 4 shows an exemplary arbitration protocol of the system shown in FIG. 2. The arbitration protocol comprises fourteen exemplary ICU clock cycles in this case.

Table 1 provides a short description of each of the exemplary cycles shown in FIG. 4:

TABLE 1

| Cycle | State | Description |
| --- | --- | --- |
| 1 | IDLE | No pending service requests |
| 2 | IDLE | Three pending service requests with priorities 0x113, 0x121 and 0x123. |
| | | Each SRN with a service request asserts or_tree0011. |
| 3 | ARB | Start arbitration. |
| | | icu_res is '00010' indicating that there will be three arbitration rounds. |
| | | Each SRN with a service request asserts or_tree0011. |
| 4 | HOLD1 | Each arbitration rounds take two cycles a HOLD1 and a COMP cycle. |
| | | First arbitration round, HOLD1 cycle |
| | | All three SRNs with pending service requests select their SRPN bits [11:8] and assert the |
| | | or_tree signal that corresponds to its SRPN[11:8] encoding (or_tree0001). |

TABLE 1-continued

| Cycle | State | Description |
|---|---|---|
| 5 | COMP | First arbitration round, COMP cycle<br>All three SRNs continue to assert the or_tree signal that corresponds to its SRPN[11:8] encoding, and compare icu_res[3:0] to their SRPN[11:8]. They all remain 'in' the arbitration and participate in the next arb round |
| 6 | HOLD1 | Second arbitration round, HOLD1 cycle<br>All three SRNs with pending service requests select their SRPN bits [7:4] and assert the or_tree signal that corresponds to its SRPN[7:4] encoding. One SRN (SRPN = 0x113) asserts or_tree0001, and the others (SRPN = 0x121/0x123) assert or_tree0010. |
| 7 | COMP | Second arbitration round, COMP cycle<br>One SRN (SRPN = 0x113) asserts or_tree0001, and the others (SRPN = 0x121/0x123) assert or_tree0010.<br>SRNs compare icu_res to their SRPN[7:4].<br>One SRN (SRPN = 0x113) drops out of the arbitration, and the others stay in. |
| 8 | HOLD1 | Third arbitration round, HOLD1 cycle<br>The two remaining SRNs with pending service requests select their SRPN bits [3:0] and assert the or_tree signal that corresponds to its SRPN[3:0] encoding. One SRN (SRPN = 0x123) asserts or_tree0011, and the other (SRPN = 0x121) asserts or_tree0001. |
| 9 | COMP | Third arbitration round, COMP cycle<br>One SRN (SRPN = 0x123) asserts or_tree0011, and the other (SRPN = 0x121) assert or_tree0001.<br>The SRNs that are still in (SRPN = 0x123/0x121) compare icu_res to their SRPN[3:0].<br>One SRN (SRPN = 0x121) drops out of the arbitration but the other SRN (SRPN = 0x123) wins the arbitration. |
| 10 | HOLD2 | Waiting for the processor to accept the service request.<br>Winning SRN/s (with prio 0001 0010 0011)<br>asserts or_tree0010 to signal the ICU that the request is still active (was not cancelled during arbitration)<br>sends 5 bit ECC of its priority via or_tree0100 to or_tree 1000 to the ICU, ICU checks with saved winner prio<br>ICU sends ECC via icu_res[4:0] back to SRNs, winning SRN checks with own prio |
| 11 | HOLD2 | Waiting for the processor to accept the service request.<br>Winning SRN/s (with prio 0011 0010 0001)<br>asserts or_tree0010 to signal the ICU that the request is still active (was not cancelled during arbitration)<br>sends 5 bit ECC of its priority via or_tree0100 to or_tree 1000 to the ICU, ICU checks with saved winner prio<br>ICU sends ECC via icu_res[4:0] back to SRNs, winning SRN checks with own prio |
| 12 | HOLD2 | The processor accepts the service request.<br>Winning SRN/s (with prio 0001 0010 0011)<br>asserts or_tree0010 to signal the ICU that the request is still active (was not cancelled during arbitration)<br>sends 5 bit ECC of its priority via 5 or_tree signals (or_tree0100: or_tree 1000) to the ICU, ICU checks with saved winner prio<br>ICU sends ECC via icu_res[4:0] back to SRNs, winning SRN checks with own prio |
| 13 | IDLE | The winning SRN (SRPN = 0x123) clears its service request flag<br>Each SRN with a service request asserts or_tree0011. |
| 14 | ARB | Start arbitration.<br>icu_res is '00010' indicating that there will be three arbitration rounds.<br>Each SRN with a service request asserts or_tree00011. |

Figure 5:
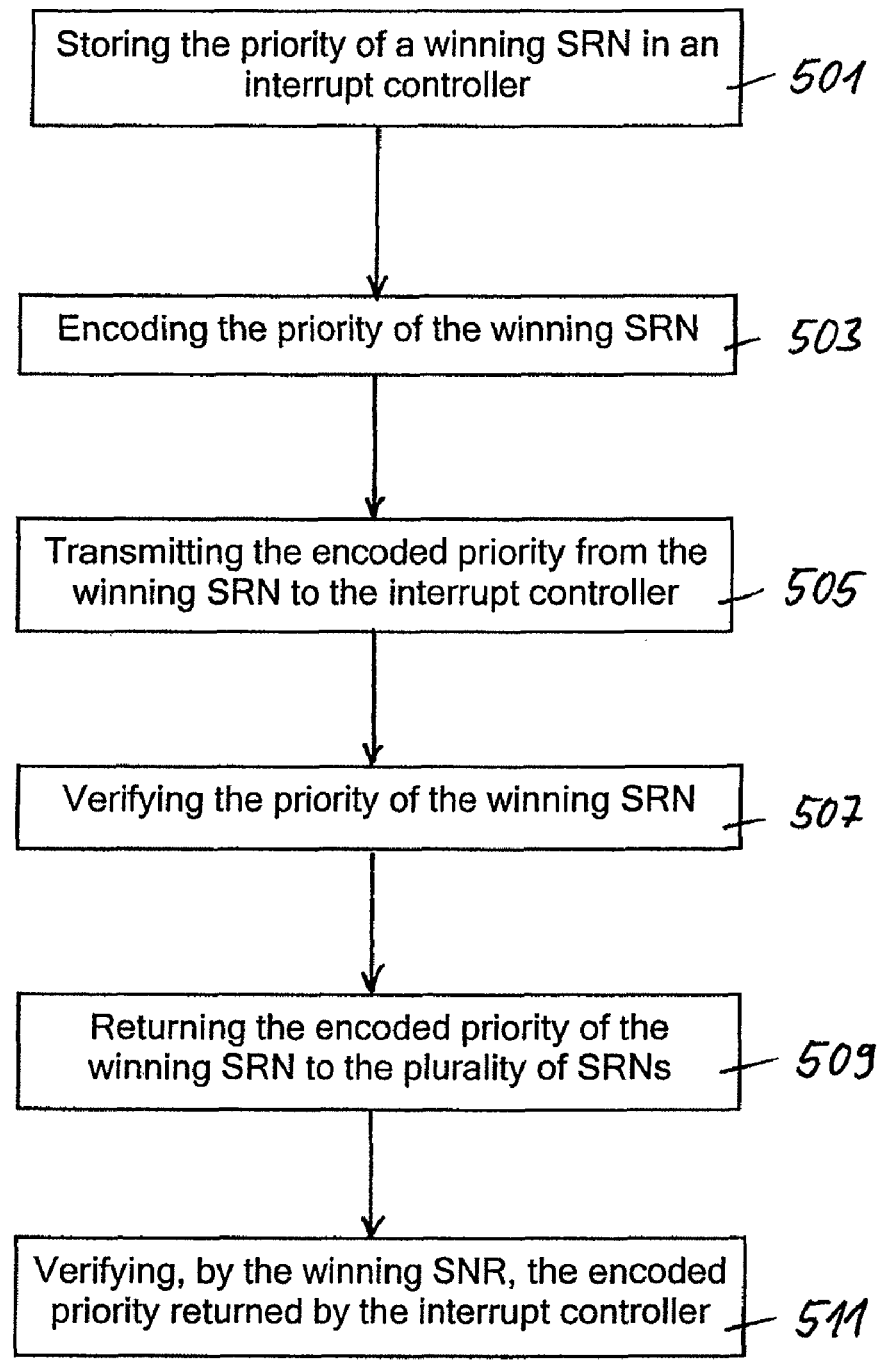

FIG. 5 shows a schematic simplified flowchart illustrating a method for verifying a priority of a winning service request node in accordance with a further embodiment of the invention. The priority of the winning service request node may have been established in an arbitration between a plurality of service request nodes (SRNs) having active service requests.

It is to be noted that the order of the method steps as illustrated in FIG. 5 and in the following description thereof is an exemplary order. Thus, the invention is not limited to this exemplary order as the method steps may also be carried out in a different order. In particular, some of the method steps may also be carried out simultaneously.

According to the exemplary order illustrated in FIG. 5, the method starts with step 501. In step 501, the priority of the winning SRN is stored in an interrupt controller.

Then, in step 503, the priority of the winning SRN is encoded, wherein the encoding allows for error detection.

Advantageously, an error-detecting code (EDC) or an error-correcting code (ECC) may be used for encoding the priority of the winning SRN.

Then, in step 505, the encoded priority of the winning SRN is transmitted from the winning SRN to the interrupt controller and verified in step 507. The priority of the winning SRN may be verified by comparing the encoded priority transmitted by the winning SRN with the priority of the winning SRN established in the arbitration and stored in the interrupt controller.

Advantageously, the step of verifying the priority of the winning SRN may be carried out by the interrupt controller or the interrupt controller may forward the two priorities to be compared to an integrated circuit for verification.

Finally, in step 509 the encoded priority of the winning SRN is returned to the plurality of SRNs and verified by the winning SRN in step 511. The verification of the encoded priority returned by the interrupt controller may be carried out by the winning SRN by comparing the returned encoded priority with its own priority.

FIG. 6 shows a schematic simplified flowchart illustrating a method for verifying a priority of a winning service request node in accordance with a further embodiment of the invention.

It is to be noted that the order of the method steps as illustrated in FIG. 6 and in the following description thereof is an exemplary order. Thus, the invention is not limited to this exemplary order as the method steps may also be carried out in a different order. In particular, some of the method steps may also be carried out simultaneously.

According to the exemplary order illustrated in FIG. 6, the method starts with step 601. In step 601, the priorities of all SRNs having active interrupt requests are encoded.

Then, in step 603, the priorities and the encoded priorities of all SRNs having active interrupt requests are transmitted to the interrupt controller.

Then, in step 605, a winning SRN having the highest priority is determined by arbitrating between the plurality of SRNs.

Then, in step 607, the priority of the winning SRN is verified by means of the encoded priority transmitted by the winning SRN.

Finally, in steps 609 and 611, the encoded priority of the winning SRN is returned to the plurality of SRNs and the winning SRN verifies the encoded priority returned by the interrupt controller.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system for secure interrupt handling, the system comprising:
 a plurality of service request nodes (SRNs) and an interrupt controller, wherein
 the interrupt controller is configured to arbitrate between SRNs having active service requests to determine a winning SRN having the highest priority and store the priority of the winning SRN;
 the winning SRN is configured to encode its priority and transmit its encoded priority to the interrupt controller, wherein the encoding allows for error detection;
 the interrupt controller is further configured to receive the encoded priority of the winning SRN,
 verify it by means of the stored priority of the winning SRN or
 forward the encoded priority of the winning SRN and the stored priority of the winning SRN established in the arbitration to an integrated circuit for verification,
 the interrupt controller is further configured to transmit a signal indicating the winning SRN established in the arbitration to the SRNs having active interrupt requests; and
 the signal indicating the winning SRN comprises the priority of the winning SRN.

2. The system of claim 1, wherein each of the plurality of SRNs which has an active service request is further configured to send its priority to the interrupt controller;
 the interrupt controller is further configured to receive the priorities of the SRNs having active service requests and perform the arbitration between the plurality of SRNs having active service requests based on the received priorities.

3. A system or secure interrupt handling, the system comprising:
 a plurality of service request nodes (SRNs) and an interrupt controller, wherein
 the interrupt controller is configured to arbitrate between SRNs having active service requests to determine a winning SRN having the highest priority and store the priority of the winning SRN;
 the winning SRN is configured to encode its priority and transmit its encoded priority to the interrupt controller, wherein the encoding allows for error detection;
 the interrupt controller is further configured to receive the encoded priority of the winning SRN,
 verify it by means of the stored priority of the winning SRN or forward the encoded priority of the winning SRN and the stored priority of the winning SRN established in the arbitration to an integrated circuit for verification;
 the interrupt controller is further configured to return the encoded priority of the winning SRN to the SRNs having active service requests; and
 the winning SRN is further configured to verify the encoded priority returned by the interrupt controller by comparing the returned encoded priority with its own priority.

4. A system or secure interrupt handling, the system comprising:
 a plurality of service request nodes (SRNs) and an interrupt controller, wherein
 the interrupt controller is configured to arbitrate between SRNs having active service requests to determine a winning SRN having the highest priority and store the priority of the winning SRN;
 the winning SRN is configured to encode its priority using an error-detecting code (EDC) or an error-correcting code (ECC) and transmit its encoded priority to the interrupt controller, wherein the encoding allows for error detection;
 the interrupt controller is further configured to receive the encoded priority of the winning SRN, and
 verify it by means of the stored priority of the winning SRN or
 forward the encoded priority of the winning SRN and the stored priority of the winning SRN established in the arbitration to an integrated circuit for verification; and
 the SRNs comprise EDC or ECC registers and the winning SRN is configured to verify the EDC or ECC encoded priority returned by the interrupt controller by comparing the returned EDC or ECC encoded priority with an EDC or ECC encoded priority in its EDC or ECC register.

5. A system or secure interrupt handling, the system comprising:
 a plurality of service request nodes (SRNs) and an interrupt controller, wherein
 the interrupt controller is configured to arbitrate between SRNs having active service requests to determine a winning SRN having the highest priority and store the priority of the winning SRN;
 the winning SRN is configured to encode its priority using an error-detecting code (EDC) or an error-correcting code (ECC) and transmit its encoded priority to the interrupt controller, wherein the encoding allows for error detection;
 the interrupt controller is further configured to receive the encoded priority of the winning SRN, and
 verify it by means of the stored priority of the winning SRN or
 forward the encoded priority of the winning SRN and the stored priority of the winning SRN established in the arbitration to an integrated circuit for verification; and the SRNs comprise EDC or ECC encoders and the winning SRN is configured to EDC or ECC encode its priority by means of the EDC or ECC encoder and verify the EDC or ECC encoded priority returned by the interrupt controller by comparing the returned EDC or ECC encoded priority with the EDC or ECC encoded priority output by its EDC or ECC encoder.

6. A system for secure interrupt handling, the system comprising:
a plurality of service request nodes (SRN) having EDC or ECC registers and an interrupt controller, wherein
the plurality of SRNs which have active interrupt requests are configured to send their priorities to the interrupt controller; and
the interrupt controller is configured to
arbitrate between the plurality of SRNs to determine a winning SRN having the highest priority;
read out the EDC or ECC encoded priority from the EDC or ECC register of the winning SRN:
verify the priority of the winning SRN by means of the EDC or ECC encoded priority of the winning SRN or
forward the encoded priority of the winning SRN and the priority of the winning SRN established in the arbitration to an integrated circuit for verification; and
the interrupt controller is further configured to return the EDC or ECC encoded priority of the winning SRN to the SRNs having active interrupt requests.

7. The system of claim 6, wherein the winning SRN is further configured to verify the EDC or ECC encoded priority returned by the interrupt controller.

8. The system of claim 6, wherein the winning SRN is further configured to verify the EDC or ECC encoded priority returned by the interrupt controller by comparing the returned EDC or ECC encoded priority with an EDC or ECC encoded priority in its EDC or ECC register.

9. A method for verifying a priority of a winning service request node (SRN) established in an arbitration between a plurality of service request nodes (SRNs) performed by an interrupt controller, the method comprising:
storing the priority of the winning SRN in the interrupt controller;
encoding the priority of the winning SRN, wherein the encoding allows for error detection;
transmitting the encoded priority from the winning SRN to the interrupt controller;
verifying the priority of the winning SRN by comparing the encoded priority transmitted by the winning SRN with the priority of the winning SRN established in the arbitration and stored in the interrupt controller;
returning the encoded priority of the winning SRN to the plurality of SRNs; and
verifying, by the winning SRN, the encoded priority returned by the interrupt controller by comparing the returned encoded priority with its own priority.

10. The method of claim 9, wherein each of the plurality of SRNs which has an active interrupt request sends its priority to the interrupt controller, and
the interrupt controller receives the priorities of the SRNs having active interrupt requests and performs the arbitration between the plurality of SRNs based on the received priorities.

11. A method for verifying a priority of a winning service request node (SRN) established in an arbitration between a plurality of service request nodes (SRNs) performed by an interrupt controller, the method comprising:
storing the priority of the winning SRN in the interrupt controller;
encoding the priority of the winning SRN, wherein the encoding allows for error detection;
transmitting the encoded priority from the winning SRN to the interrupt controller; and
verifying the priority of the winning SRN by comparing the encoded priority transmitted by the winning SRN with the priority of the winning SRN established in the arbitration and stored in the interrupt controller,
wherein the step of verifying the priority of the winning SRN comprises forwarding the encoded priority transmitted by the winning SRN and the priority of the winning SRN established in the arbitration and stored in the interrupt controller to an integrated circuit for verification.

12. A method for verifying a priority of a winning service request node (SRN) established in an arbitration between a plurality of service request nodes (SRNs) performed by an interrupt controller, the method comprising:
storing the priority of the winning SRN in the interrupt controller;
encoding the priority of the winning SRN using an error-detecting code (EDC) or an error-correcting code (ECC), wherein the encoding allows for error detection;
transmitting the encoded priority from the winning SRN to the interrupt controller; and
verifying the priority of the winning SRN by comparing the encoded priority transmitted by the winning SRN with the priority of the winning SRN established in the arbitration and stored in the interrupt controller,
wherein the SRNs comprise EDC or ECC registers and the winning SRN verifies the EDC or ECC encoded priority returned by the interrupt controller by comparing the returned EDC or ECC encoded priority with an EDC or ECC encoded priority in its EDC or ECC register.

13. A method for verifying a priority of a winning service request node (SRN) established in an arbitration between a plurality of service request nodes (SRNs) performed by an interrupt controller, the method comprising:
storing the priority of the winning SRN in the interrupt controller;
encoding the priority of the winning SRN using an error-detecting code (EDC) or an error-correcting code (ECC), wherein the encoding allows for error detection;
transmitting the encoded priority from the winning SRN to the interrupt controller; and
verifying the priority of the winning SRN by comparing the encoded priority transmitted by the winning SRN with the priority of the winning SRN established in the arbitration and stored in the interrupt controller,
wherein the SRNs comprise EDC or ECC encoders and the winning SRN EDC or ECC encodes its priority by means of the EDC or ECC encoder and verifies the EDC or ECC encoded priority returned by the interrupt controller by comparing the returned EDC or ECC encoded priority with the EDC or ECC encoded priority output by its EDC or ECC encoder.

14. A method for verifying integrity of service requests, the method comprising:
encoding service requests of a plurality of service request sources, wherein the encoding allows for error detection;
transmitting the service requests and the encoded service requests from the plurality of service request sources to a service request controller;
determining a winning service request source by arbitrating between the plurality of service request sources;

verifying the identity of the winning service request source by means of the encoded service request of the winning service request source; and returning the encoded service request of the winning service request source to the plurality of service request sources.

15. The method of claim 14, further comprising verifying, by the winning service request source, the returned encoded service request by comparing the encoded service request returned from the service request controller with the service request of the winning service request source.

16. An apparatus for verifying integrity of service requests, the apparatus comprising:

means for encoding service requests of a plurality of service request sources, wherein the encoding allows for error detection;

means for transmitting the encoded service requests from the plurality of service request sources to a service request controller;

means for determining a winning service request source by arbitrating between the plurality of service request sources;

means for returning the encoded service request of the winning service request source to the plurality of service request sources;

means for verifying, at the winning service request source, the returned encoded service request by comparing the encoded service request returned from the service request controller with the service request of the winning service request source.

* * * * *